US006571271B1

(12) United States Patent
Savitzky et al.

(10) Patent No.: US 6,571,271 B1
(45) Date of Patent: May 27, 2003

(54) NETWORKED APPLIANCE FOR RECORDING, STORING AND SERVING DIGITAL IMAGES

(75) Inventors: Stephen Savitzky, San Jose, CA (US); Gregory Wolff, Mountain View, CA (US); Rithy K. Roth, Newark, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/304,545

(22) Filed: May 3, 1999

(51) Int. Cl.[7] .............................................. G06F 13/00
(52) U.S. Cl. ...................................... 709/200; 709/226
(58) Field of Search .............................. 345/346, 357, 345/501; 396/639; 455/566; 707/10; 709/200, 201, 203, 232, 226; 710/62

(56) References Cited

U.S. PATENT DOCUMENTS

| | | | | |
|---|---|---|---|---|
| 5,546,598 A | * | 8/1996 | Yamaguchi et al. | 345/501 |
| 5,806,005 A | * | 9/1998 | Hull et al. | 455/566 |
| 5,995,756 A | * | 11/1999 | Herrmann | 717/178 |
| 6,017,157 A | * | 1/2000 | Garfinkle et al. | 396/639 |
| 6,035,323 A | * | 3/2000 | Narayen et al. | 709/201 |
| 6,058,428 A | * | 5/2000 | Wang et al. | 709/232 |
| 6,085,195 A | * | 7/2000 | Hoyt et al. | 707/10 |
| 6,097,389 A | * | 8/2000 | Morris et al. | 345/346 |
| 6,121,970 A | * | 9/2000 | Guedalia | 354/357 |
| 6,167,469 A | * | 12/2000 | Safai et al. | 710/62 |
| 6,223,190 B1 | * | 4/2001 | Aihara et al. | 707/513 |
| 6,243,102 B1 | * | 5/2001 | Ruff et al. | 345/433 |

OTHER PUBLICATIONS

"The Open Image Retrieval System "GIRLS" on the World Wide Web," By Takaha et al, Translated Japanese article by the USPTO, PTO 99–0193, Nov. 1998.*

* cited by examiner

Primary Examiner—N. Le
Assistant Examiner—Walter Benson
(74) Attorney, Agent, or Firm—Philip H. Albert; Townsend and Townsend and Crew LLP (57) ABSTRACT

An image server is captures images from a digital camera. When the image storage device is removed from the camera and placed into a port of the image server, the image server automatically detects the image storage device and downloads the images stored thereon, adding various data elements, such as a camera ID, data of capture, and the like. Once the image is stored in the image server, the image server generates an HTML page that references the new image, or adds a new reference to an existing HTML page. The HTML pages are made available to web browsers that are able to access the image server and the images are thus presented, with optional captions and titles. The images can be stored on the image server and be searched by text (i.e., from the captions or titles) or by image features.

5 Claims, 5 Drawing Sheets

NETWORKED APPLIANCE FOR RECORDING, STORING AND SERVING DIGITAL IMAGES

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of document handling. More specifically, one embodiment of the invention provides for improved image handling in a networked appliance for recording, storing and serving digital images.

Video image capture devices are known, and many such devices have been used to capture images for presentation and distribution. In a typical process, a person uses a digital camera to capture a desired image. If the digital camera is not tethered to a personal computer, the person then connects the digital camera to a computer. Either way, the person would then have to open a photo processing application, capture the image and store it to a disk file after selecting a disk file name. To present the image on a web page (such as a page accessible by browsers of the World Wide Web available over the global internetwork of networks generally known as the "Internet"), the person would then have to create HyperText Markup Language (HTML) documents to reference an image file and move the stored image into the image file location. This operation typically involves at least two computers, the user's input computer and the server computer which serves the images, once the person's work is done, to web browsers.

The above complexity makes it difficult to quickly and easily capture images for presentation on a web.

SUMMARY OF THE INVENTION

An improved image server is provided by virtue of the present invention. In one embodiment of an image server according to the present invention, images are captured on a digital camera, which includes a removable image storage device. The image storage device is removed from the camera and placed into a port of an image server. The image server then automatically detects the image storage device and downloads the images stored thereon, adding various data elements, such as a camera ID, date of capture, and the like. Once the image is stored in the image server, the image server generates an HTML page that references the new image, or adds a new reference to an existing HTML page. The HTML pages are made available to web browsers that are able to access the image server and the images are thus presented, with optional captions and titles.

In a specific embodiment of an image server, the images stored thereon are also searchable by text (i.e., from the captions or titles) or by image features.

A further understanding of the nature and advantages of the inventions herein may be realized by reference to the remaining portions of the specification and the attached drawings.

DESCRIPTION OF THE SPECIFIC EMBODIMENTS

Figure 1:
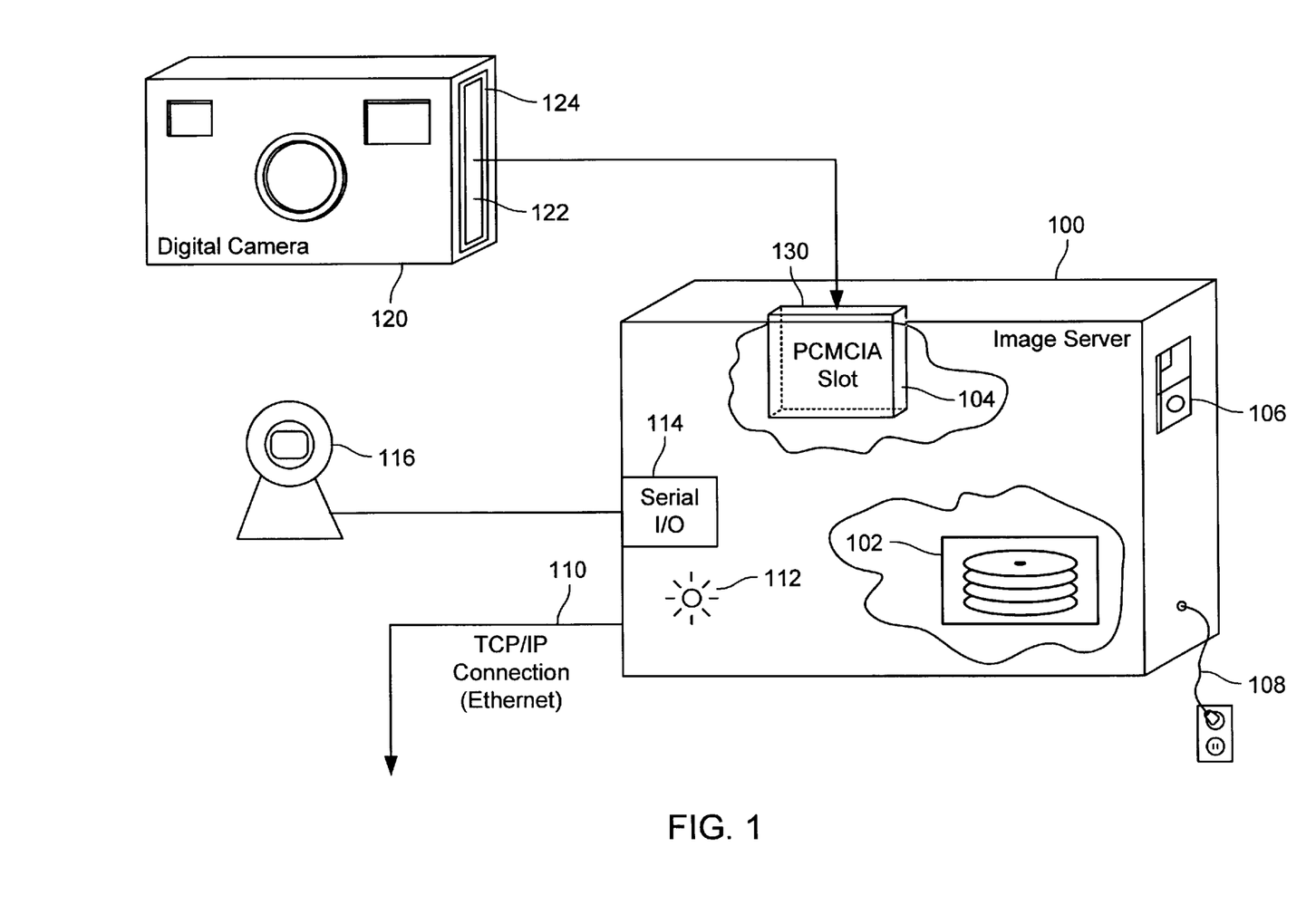
FIG. 1 is a block diagram of an image capture and server system according to the present invention.

According to one embodiment of the present invention, a networked office appliance that functions as a digital "photograph album" is described herein. FIG. 1 is a block diagram of an image server 100 that functions as such a digital photograph album. Image server 100 is shown comprising a hard disk 102 (or other mass storage device) for image storage, a card slot 104 for accepting memory cards (in this example, the cards are PCMCIA memory cards), a switch 106, a power source 108 and a network interface 110. Optionally, image server 100 might include an indicator light 112 for indicating status of downloads and a device interface 114 for interfacing to a tethered digital camera 116. Instead of indicator light 112, a speaker might be used to indicate the completion of a download. Device interface 114 might be a special purpose card or an industry standard interface such as a serial port device.

In operation, a user would capture images on a digital camera, such as camera 120. Unlike tethered camera 116, camera 120 is self-contained with its own power source and storage device. In this case, the storage device is a memory card 122, which is inserted into camera slot 124 when images are being captured. To transfer, store, publish and distribute images, all the user needs to do is remove memory card 122 and insert it into a PCMCIA slot 130 on image server 100. Image server 100 then handles all the rest of the operations without further input from the user.

Figure 2:
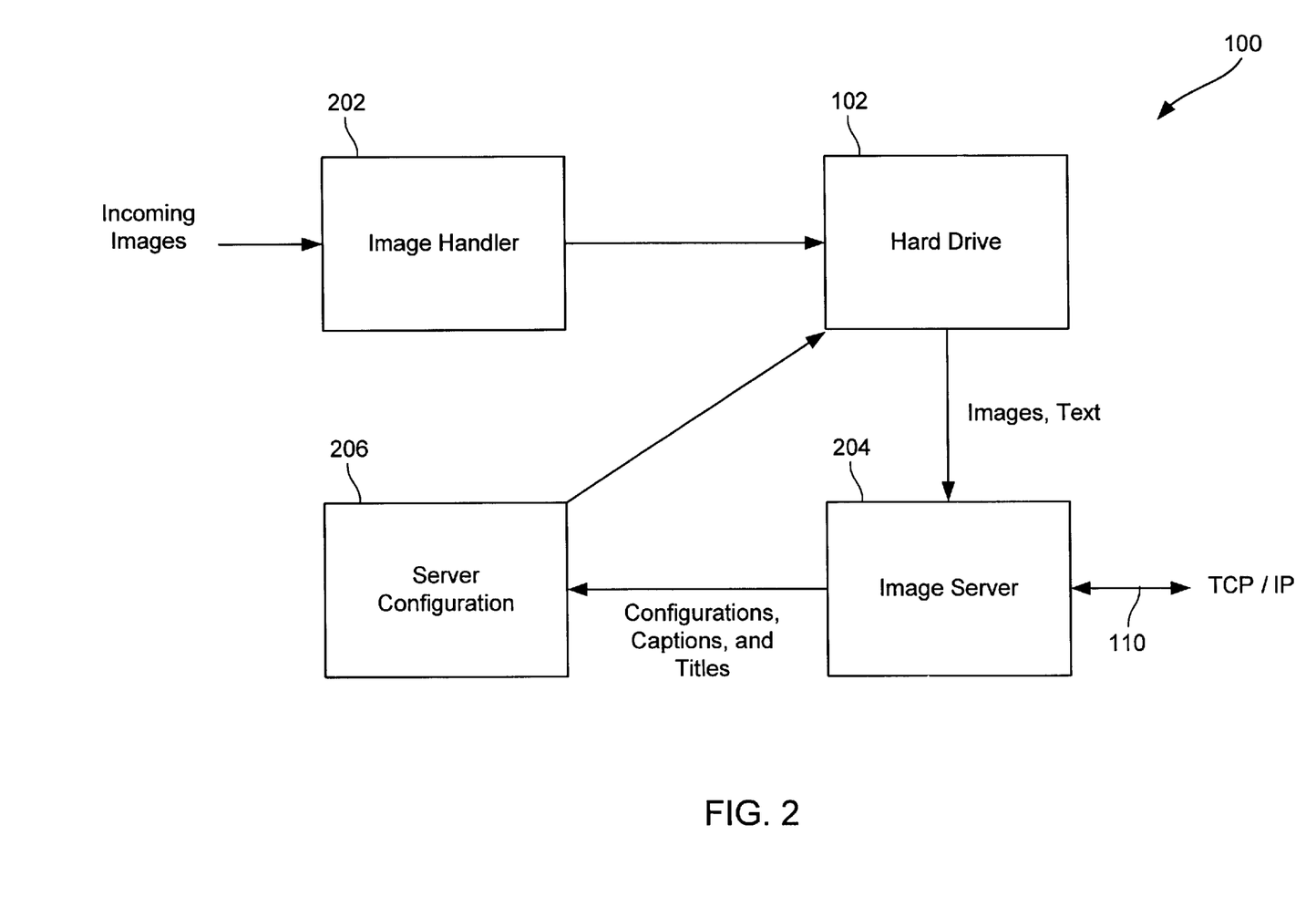
FIG. 2 is a functional block diagram of some internal elements of the image server shown in FIG. 1.

FIG. 2 is a functional block diagram of the internals of image server 100, including an image handler 202, an image server 204 and a server configurator 206. In the preferred embodiment, image handler 202, image server 204 and server configurator 206 are implemented by programming a general-purpose digital computer. With suitable selection of digital computer, those three elements can me implemented using a single computer, running code for each of the elements. An example of suitable code for these elements is shown in an appendix to this application.

Figure 3:
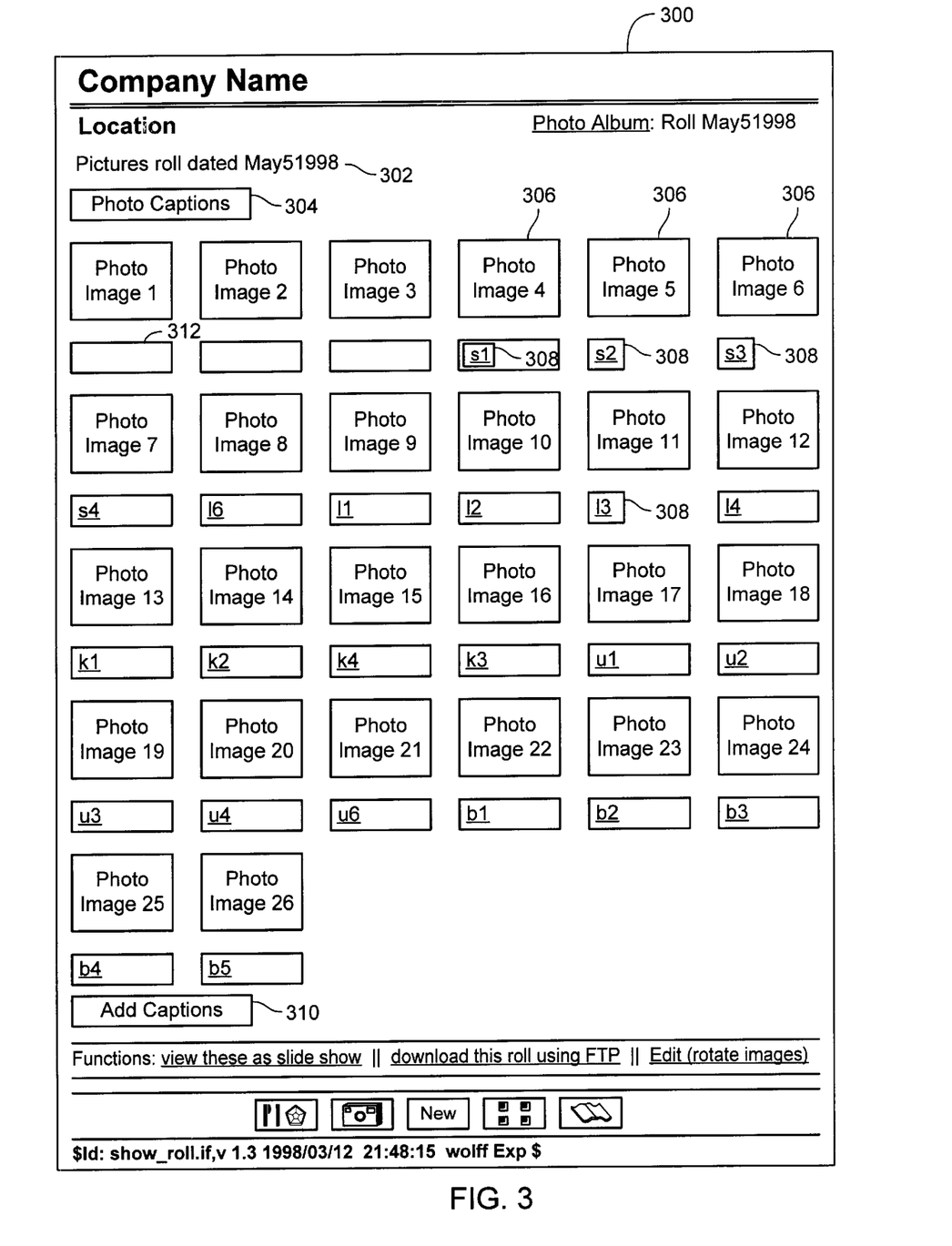
FIG. 3 is an example presentation of an image on a web page with captioning and a title.

In operation, image handler 202 polls slot 130 until it detects a card with images stored thereon and, if present, periodically polls tethered camera 116 for images. Those images are placed on hard disk 102. As images are downloaded, the light or the speaker might indicate the beginning and/or end of a download. The card can then be erased so that it can be reused upon replacement into camera 120 once a visible or audible indication is given that the operation has been completed. Any HTML pages (stored on hard disk 102) which reference the new image are updated, and new HTML pages are created as needed. Image server 204, which might be a standard or modified HyperText Transport Protocol (HTTP) server, then presents the HTML pages to HTTP clients as requested via network interface 110. An example of such an HTML page is shown in FIG. 3. If desired, the images can be moved from hard disk 102 to a public server, here many viewers can obtain the images.

A direct user interface for image server 100 is not necessary (none is shown in FIG. 1 except for the indicator light). All configuration commands and information can be sent to server configurator 206 via image server 204. Such commands and information might include captions for the stored images and titles as well as maintenance commands. A form can be provided by which captions or keywords can be added to images, and by which images can be rotated, deleted, moved, etc.

FIG. 3 is an example of an HTML page 300 displaying stored images. As shown, HTML page 300 includes an identification 302 of the roll, a control (button) 304 for editing captions, the images themselves 306, each having an associated caption 308. A control 310 is also provided to submit and save changes. Some images are not yet labelled, and thus have blank controls 312 in place of captions. Those controls 312 can be used to add captions. Captions 308 are shown as HTML links, so that a user can click on one of the captions 308 to perform an action such as showing a larger view of the image or allowing a caption to be edited.

Figure 4:
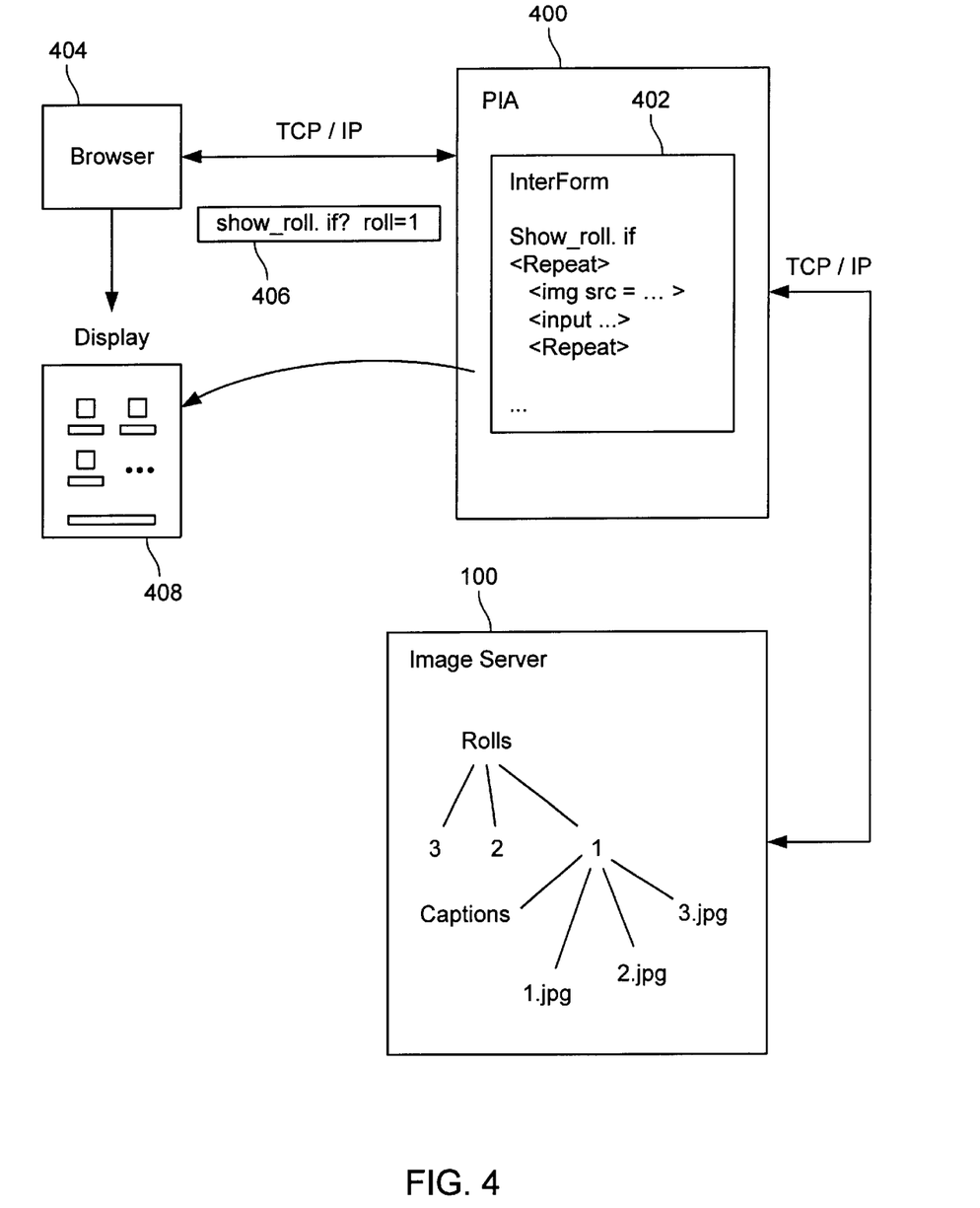
FIG. 4 is a block diagram of a Personal Information Agency (PIA) associated with the image server shown in FIGS. 1–2.

FIG. 4 is a block diagram of a personal information agency ("PIA") for implementing an image server according to one embodiment of the present invention. As show therein, a PIA 400 comprises an InterForm document 402 (among other InterForm documents not shown) for handling image requests from a browser 404. PIA 400 is coupled to image server 100 (see FIGS. 1–2 for details on image server 100) via a TCP/IP link.

In operation, browser 404 sends a request 406 to PIA 400, which processes the request with InterForm document 402 to generate display 408. An example of a display that might be generated as display 408 is shown in FIG. 3. InterForm document 402 includes instructions for showing each image of a roll of images and obtaining those images from image server 100. The complete text of InterForm document 402 is not shown—it might also include process tags for handling submissions of captions and saving of images to disk.

With the image capture and image server systems described above, many applications are possible. Where the sole user interface for such a system is the insertion of an image storage card into a kiosk, a very simple to use image handling system can be devised.

Figure 5:
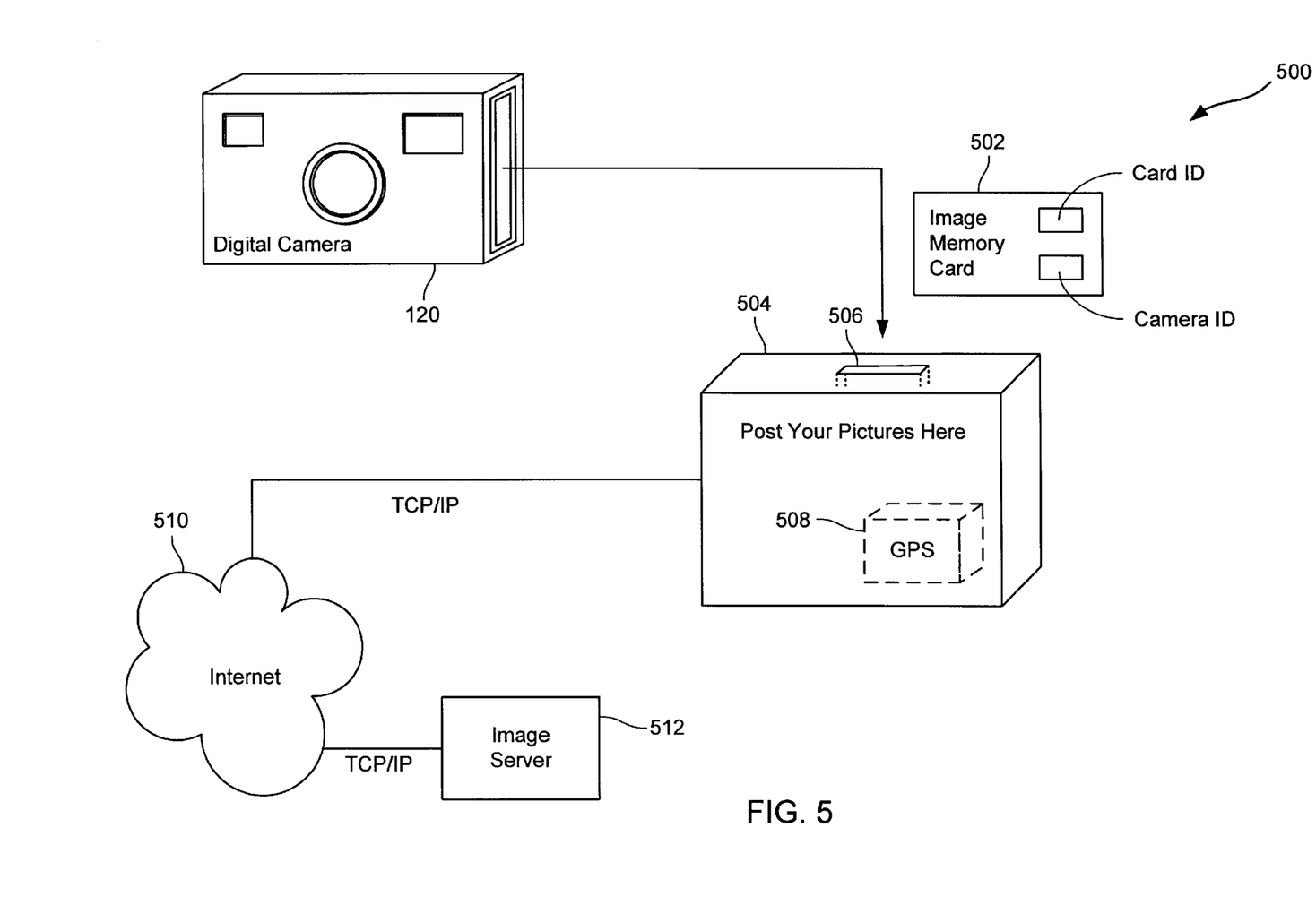
FIG. 5 is an illustration of one application of the image capture and server system, using a kiosk as the image capture device.

FIG. 5 illustrates one such kiosk system 500. To use kiosk system 500, a user simply captures images with a digital image capture device, such as digital camera 120. Once the desired images are captured, the user removes an image memory card 502 from digital camera 120 and inserts image memory card 502 into a slot 506 in kiosk 504. In response to that simple action, the kiosk 504 will then download the images stored on image memory card 502 and upload them, through Internet 510 to a prespecified image server 512, optionally generating captions and XML files on the fly describing the images to create pages such as that illustrated in FIG. 3. From image server 512, the images are available as described above.

In some variations of kiosk system 500, image memory card 502 includes storage for a card identifier and a camera identifier, either of which can be used as a user identifier. That way, a kiosk system located in a public place, such as an amusement park, can be used by anyone with a compatible image memory card to automatically upload and serve images shortly after capture. In addition to the card and camera identifiers, other information can be added to the image files, such as the time of day and/or the location of kiosk 504, which can be hardwired into kiosk 504 or can be provided by a Global Positioning System (GPS) receiver 508 housed within kiosk 504. If GPS capability is built into the camera itself, the actual location from where the picture was taken can be obtained.

Appended hereto is Appendix A, which lists source code (in the Perl language) for one example of a script implementing image handler 202. That script is run automatically when a card is inserted and it copies image files from the card to a destination directory. The use of active documents is described in (U.S. application Ser. No. 09/303,818, filed Apr. 30, 1999 and entitled "Method and System for Processing Documents Controlled by Active Documents with Embedded Instructions") and U.S. Pat. No. 6,012,083 (U.S. application Ser. No. 08/718,858, filed Sep. 24, 1996 and entitled "Method and Apparatus for Document Processing Using Agents to Process Transactions Created Based on Document Content"). Those applications are commonly owned with the present application and are incorporated by reference herein for all purposes.

The above description shows a novel image server which automatically transfers images to long-term storage from where the images can be served to web browsers automatically and can automatically manage digital photographs and HTML text and directory structures for being able to present searchable images with captions from a networked device without requiring a direct user interface to the networked device. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

APPENDIX A.
Source Code Listing for Image Handler Perl Script

```
1    #!/usr/bin/perl
2    #      $Id: copy_j6i,v #.# yyyy/mm/dd hh:mm:ss pia Exp $
3
4    ###This is the script that is run automatically when a card is inserted.
5    ###It copies image files from the card to the destination directory.
6    ###copy all files in from $1 to $2, create jpegs and makeTOC
7    $quantfile = "~/.pia/Photo_Album/.quant"; # saves time for thumbnails
8    $tmpfile = "/tmp/pnm"; # not used currently
9
10   ###should directory be unmounted afterwards?
11   $unmount = 1;
12   umask 2;
```

-continued

APPENDIX A.
Source Code Listing for Image Handler Perl Script

```
13
14  ##should make stats same for new file as for j6i
15
16  sub cvj6i {
17      local($from, $to, $togif) = @_;
18
19      $status = system("tail +173c $from | djpeg |pnmscale −width 640
20  −height 480 | cjpeg −quality 85 > $to");
21
22                          # if fast jpeg available...
23  #   $status = system("jpeg −u −packRGB −C 2 < $from | pnmcut 4 0 764
24              480 | pnmscale −width 640 −height 480
25              >$tmpfile") ; # pnmcut causes pipes to be killed
26  #   $status= system("pnmtorast $tmpfile | jpeg −Q 25 > $to");
27
28  die "failed conversion $status on $from $to \n command was \n"
29      if $status;
30                          # Now make icon
31  my $options ="256";
32                          # quantization file saves time
33  $options ="-map $quantfile" if −f $quantfile;
34
35  $status = system("djpeg < $to | pnmscale −width 64 −height 48
36      |ppmquant $options | ppmtogif> $togif") if defined $togif;
37  }
38
39  $from = shift;
40  $from = "/ide" unless $from;
41
42  $date = localtime;
43  @day = split(" ",$date)
44  $today = "$day[1]$day[2]$day[4]";
45  $to = shift;
46  $to = "~/.pia/Photo_Album" unless $to;
47  $to = "$to/$today";
48  $ct = 0;
49  $tonew = $to;
50
51  #print "copy_j6i $from $to\n";
52
53  ## check for existing directory
54  while (−e $to) {         # If better filenames are desired, this can be
55                          # changed.
56      $to = "$tonew.$ct";
57      $ct++;
58  }
59
60  print "making $to" if $main: :debugging;
61  mkdir ($to, 0777)
62
63  ##get right directory name
64  @foo = split("/",$to)
65  $dimam = $foo[$#foo];
66
67  $formproc = "/Photo_Album/captions.if";
68  $table = "$to/index.html";
69
70  # check for non j6i disc and abort
71  @files = <$from/*.j6*>;
72  if ($#files < 0) { print " not j6i disc \n"; exit 0; }
73
74  # copy all files over
75  $copystatus = system("cp −p $from/* $to ");
76  die " copy failed" if $copystatus;
77
78                          # remove files now before card gets removed
79
80  $copystatus = system("rm −f $from/* ") unless −e
81  "/home/pia/.pia/Photo_Album/no_erase";
82
83  #unmount ?
84  $unmountstatus = system("umount $from ") if $unmount;
85
86                          # .convert to jpg
87  chdir $to;
88
```

-continued

APPENDIX A.
Source Code Listing for Image Handler Perl Script

```perl
89   @jfiles = <*.j6i>;
90
91   for $file (@jfiles) {
92       if (-f $file) {
93           $f=$file;
94           $f =~ s/\.j6i$//;
95           $f2 = "$f.jpg";
96           $f3 = "$f.small.gif";
97
98           cvj6i($file,$f2,$f3) unless -f $f3;
99           push(@jpegs,$f)
100
101      } else {
102 #        print "not found $f \n";
103      }
104  }
105                          # now make index
106
107  #create a table from a list of files
108  $root = " ";    # if the img files are in another dir put it here
109  $formmaker = $formproc;
110  $formdefault = "http://photos/Photo_Album/captions.if ";
111  $formmaker = $formdefault unless defined $formmaker;
112  $rowsize = 5;
113  $header = "<table align=center cellspacing=3 cellpadding=0>\n";
114  $rowheader ="<tr>\n";
115  $trailer = "</table>\n";
116  $rowtrail = "</tr>\n";
117  $td = "<td valign=top align=center>\n";
118  $tdtrail = "</td>\n";
119  $ahead = "<a href=";
120  $atrail = "<a>";
121  $imghead = "<img src=";
122  $imgtrail = ">";
123  $jpg{"jpg>"} =1;
124  $jpg{"jpeg"} =1;
125
126  $jpegs=join(" ",@jpegs)
127
128  $formheader = "<form method=POST action=\"$formmaker\">
129      <input type=hidden name=directory value=\"$dirnam\">
130      <input type=hidden name=files value=\"$jpegs\">";
131  $formender = "<input name=captTitle value=\"Images from the DC\"><input
132      type=submit value=\"Submit Captions\"> </form>";
133
134  $captionsize = 15;
135  $addcaptionbox = 1;      # Adds an entry box for addinq a caption
136
137  sub printImg {
138      local($filename,$link) = @_;
139      print "$ahead$link> $imghead$root$filename$imgtrail$atrail";
140  }
141
142  sub printText {
143      local($filename, $caption) = @_;
144      if ($addcaptionbox) {
145          $txt = "<input name=$filename size=$captionsize>";
146      } else {
147          $txt = "$ahead$root$filename>$caption $atrail";
148      }
149      print "$txt";
150  }
151
152  sub make_index{
153
154  $count =0;
155  $flag =0;
156  print $formheader if $captionsize;
157  print $header;
158  print $rowheader;
159  $ext= 'jpg';
160
161  for $file (@_) {
162
163 #    ($file, $ext ) = ($_, 'jpg') ; #split('\.');
164      $text[$count] = "$file.$ext";
```

APPENDIX A.
Source Code Listing for Image Handler Perl Script

```
165
166     print $td;
167
168     $image[$count] = "$file.small.gif";
169     $flag = 1;              #
170     printImg ($image [$count], $text [$count])
171                             # Force a line feed to put caption below
172     print "<br>";
173
174     printText($file);#adds input field
175     print $tdtrail,
176
177     $count++;
178     if($count >= $rowsize) {
179     print "$rowtrail $rowheader";
180     $count = 0;
181     $flag = 0;
182     }
183  }
184     if($count) {
185     print "$rowtrail ";
186     }
187
188  print "$trailer";
189  print $formender if $captionsize;
190
191  }
192                             # should let agency make table . . .
193  open(INDEX, ">$table")
194  select INDEX;
195  make_index(@jpegs);
196  select STDOUT;
197  close INDEX;
198
199  chdir ". . .";
200  open(LOG, ">.latest")
201  print LOG "$dirnam";
202  close LOG;
203  open(LOG, ">>.catalog")
204  print LOG "$dirnam\n";
205  close LOG;
206
207  ############################ end ##################################
```

What is claimed is:

1. A networked appliance for managing digital images captured by a digital image capturing device, the captured digital images being stored on a memory device, the network appliance comprising:

an image storage, which is external to the digital image capturing device, wherein the image storage stores digital images and active documents referencing the digital images, wherein each active document contains at least one behavior applicable to at least one of the digital images, wherein a behavior of an active document specifies document processing;

an image handler for automatically detecting and reading images from the memory device when the memory device is available for reading, the image handler being coupled to the image storage to store read images thereon and being configured to automatically generate the active documents, including behaviors, as needed to present the read images;

an image server, coupled to the image storage, for serving HTML pages with images referenced thereon upon receipt of requests by image clients, wherein the HTML pages are generated by processing the active documents, including processing at least one behavior, using an active documents processor operated by the image server; and a network, for interconnecting the image server and image clients for transmission of the requests, the HTML pages and the images.

2. The apparatus of claim 1, further comprising a transfer means for transferring images from a local storage associated with the image storage to a public server accessible to the image server.

3. A networked appliance for managing digital images comprising:

a digital camera for capturing images into digital images;

an image storage, which is external to the digital camera, wherein the image storage receives the captured digital images from the digital camera, wherein the image storage electronically stores the digital images, wherein stored digital images can optionally be grouped into digital image rolls;

an image handler for automatically detecting and reading images from an input device when the input device is available for reading, the image handler being coupled to the image storage to store read images thereon and being configured to automatically generate active documents, wherein each active document contains at least one behavior applicable to at least one of the digital images, as needed to present the read images, wherein a behavior of an active document specifies document processing, wherein an automatically generated HTML page associated with a digital image includes an image capture date, a unique camera identifier and a unique image identifier;

an image server, coupled to the image storage, for serving HTML pages with images referenced thereon upon receipt of requests by image clients, wherein the HTML pages are generated by processing the active documents, including processing at least one behavior, using an active documents processor operated by the image server; and a network, for interconnecting the image server and image clients for transmission of the requests, the HTML pages and the images.

4. The apparatus of claim 3, wherein the image storage comprises:

an image storage structure comprising either an XML page or a directory structure created when images are copied to image storage; and means for creating HTML pages on the fly in response to a request to store an image.

5. An image server system for storing, managing and distributing images captured by a digital camera, the captured images being stored in a memory device, the image server system comprising:

image storage, external to the digital camera, for storing the digital images and active documents referencing the digital images, wherein each active document contains at least one behavior applicable to at least one of the digital images, wherein a behavior of an active document specifies document processing;

an image handler, which automatically detects the presence of the memory device when the memory device is placed in a communication interface by a user, wherein without further input from the user, the image handler automatically reads the digital images from the memory device, and stores read images on the image storage, wherein the image handler is configured to automatically generate the active documents, as needed to present the read images; and an image server, coupled to the image storage, for serving web pages with images referenced thereon upon receipt of requests by image clients, wherein the web pages are generated by processing the active documents.

* * * * *